(12) United States Patent
Amari et al.

(10) Patent No.: US 10,301,014 B2
(45) Date of Patent: May 28, 2019

(54) MONOLITHIC BLADE, A ROTORCRAFT ROTOR FITTED WITH SUCH A MONOLITHIC BLADE, AND AN ASSOCIATED ROTORCRAFT

(71) Applicant: AIRBUS HELICOPTERS, Marignane (FR)

(72) Inventors: Andre Amari, La Chapelle en Serval (FR); Jacques Gaffiero, Paris (FR)

(73) Assignee: AIRBUS HELICOPTERS, Marignane (FR)

( * ) Notice: Subject to any disclaimer, the term of this patent is extended or adjusted under 35 U.S.C. 154(b) by 207 days.

(21) Appl. No.: 15/594,961

(22) Filed: May 15, 2017

(65) Prior Publication Data

US 2017/0334555 A1    Nov. 23, 2017

(30) Foreign Application Priority Data

May 17, 2016    (FR) ...................................... 16 00782

(51) Int. Cl.
*B64C 27/48*    (2006.01)
*B64C 27/635*   (2006.01)
*B64C 27/473*   (2006.01)

(52) U.S. Cl.
CPC ............ *B64C 27/48* (2013.01); *B64C 27/635* (2013.01); *B64C 2027/4736* (2013.01)

(58) Field of Classification Search
CPC .................. B64C 27/48; B64C 27/635; B64C 2027/4736
See application file for complete search history.

(56) References Cited

U.S. PATENT DOCUMENTS

| 4,352,632 | A |   | 10/1982 | Schwarz et al. |
| 4,828,458 | A | * | 5/1989  | Pariani ................... B64C 27/33 416/123 |
| 4,990,205 | A |   | 2/1991  | Barbier et al. |
| 9,382,803 | B2 |  | 7/2016  | Ferrant et al. |

FOREIGN PATENT DOCUMENTS

| DE | 2712706 |   | 10/1978 |   |
| EP | 0034210 |   | 8/1981  |   |
| FR | 2616409 |   | 12/1988 |   |
| FR | 2984849 |   | 6/2013  |   |
| GB | 2014931 | A * | 9/1979 | ............. B64C 27/48 |

OTHER PUBLICATIONS

Notice of Preliminary Rejection for Korean Application No. 10-2017-0061155, dated Aug. 9, 2018, 9 Pages.
French Search Report for French Application No. FR 1600782, Completed by the French Patent Office, dated Jan. 20, 2017, 7 Pages.

* cited by examiner

*Primary Examiner* — Eldon T Brockman
(74) *Attorney, Agent, or Firm* — Brooks Kushman P.C.

(57) ABSTRACT

A monolithic blade of a rotorcraft rotor, the blade comprising at least locally an airfoil zone having a pressure side face and a suction side face. The invention is remarkable in that the blade has a root zone including a finger with a spherical bearing surface arranged at a root end of the blade, a recess suitable for receiving a laminated spherical bearing, and a flexible portion having a preferred direction of deformation in bending about a flapping axis of the blade, the flexible portion being arranged between the finger and the recess.

16 Claims, 3 Drawing Sheets

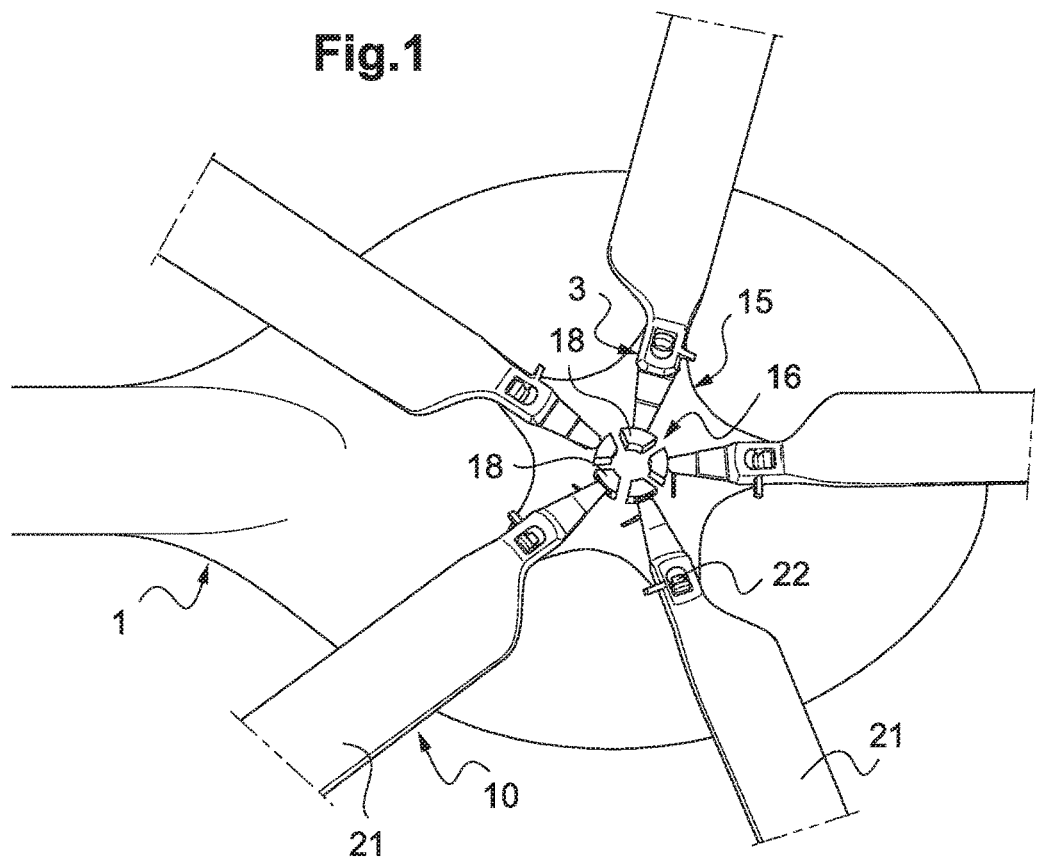
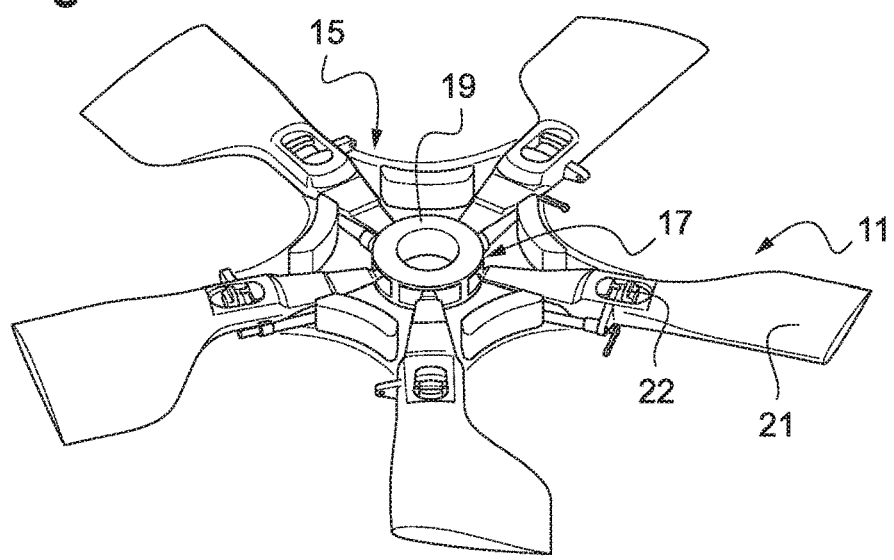

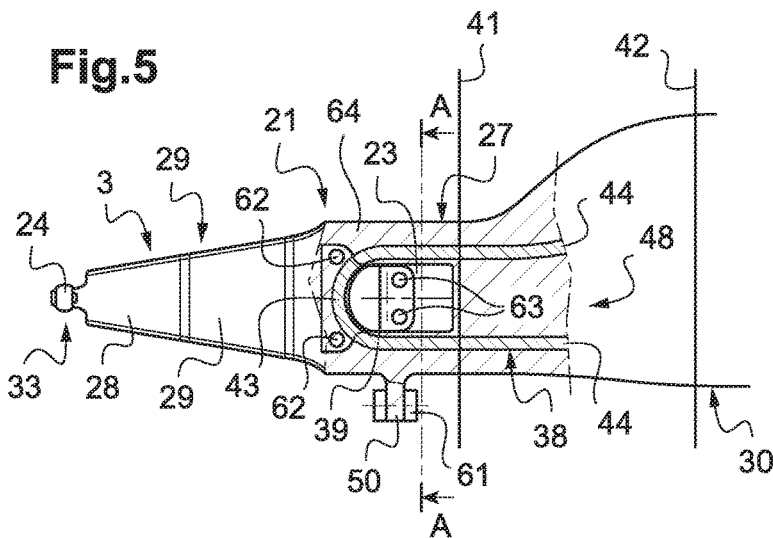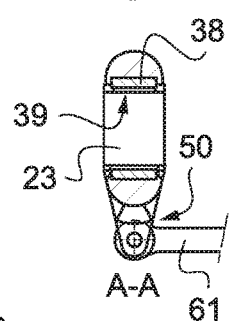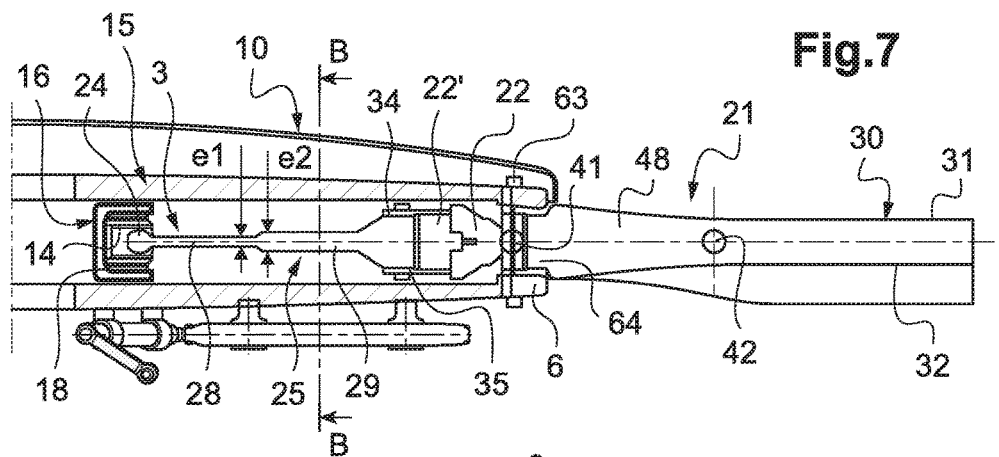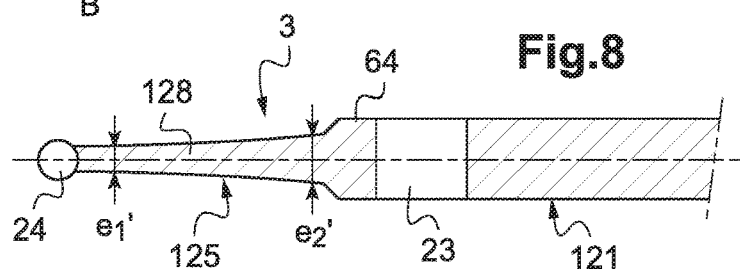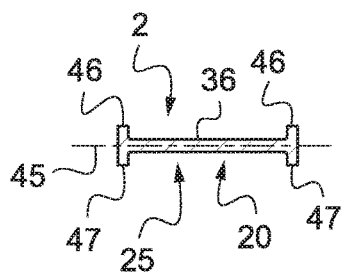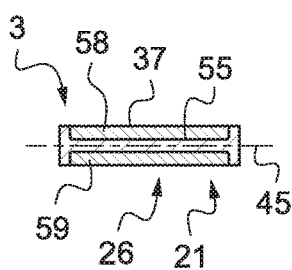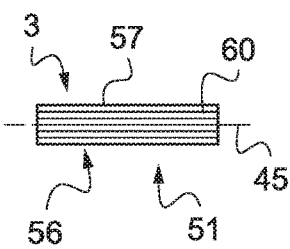

MONOLITHIC BLADE, A ROTORCRAFT ROTOR FITTED WITH SUCH A MONOLITHIC BLADE, AND AN ASSOCIATED ROTORCRAFT

CROSS-REFERENCE TO RELATED APPLICATIONS

This application claims priority to French patent application No. FR 16 00782 filed on May 17, 2016, the disclosure of which is incorporated in its entirety by reference herein.

BACKGROUND OF THE INVENTION

(1) Field of the Invention

The present invention relates to the field of aviation, and more particularly to fabricating monolithic blades that are to form a rotor of a rotary wing aircraft, to a rotor having at least two blades of this type, and to a rotary wing aircraft equipped with such a rotor.

(2) Description of Related Art

Specifically, a rotary-wing aircraft, such as a rotorcraft, generally includes at least one rotor for providing lift and possibly also propulsion. Such a lift rotor then comprises a central hub to which blades are secured and arranged substantially radially relative to an axis of rotation of the hub.

In certain circumstances, the blades may be secured via cuffs arranged at their interfaces with the central hub. Under such circumstances, the blades are then not secured directly to the central hub.

In contrast, monolithic blades are each formed by a respective single-piece part that is connected directly to the central hub of a rotor. A rotor of this type having monolithic blades thus presents a smaller number of parts and is generally lighter in weight than a rotor having both non-monolithic blades and cuffs fitted to a central hub.

This type of rotor fitted with monolithic blades can then include laminated bearings for hinging each monolithic blade directly relative to the hub about a flapping axis, a lead/lag axis, and a pitch variation axis. A rotor of this type is described in particular by the applicant in document FR 2 984 849.

Nevertheless, under such circumstances, a laminated spherical bearing serves both to hinge a monolithic blade relative to the hub and also, at least in part, to play the role of a lead/lag damper, e.g. in order to avoid ground and air resonance phenomena. Such a lead/lag damper serves to damp the oscillations of each blade relative to the hub about its lead/lag axis.

Such laminated spherical bearings are thus subjected both to radial compression forces generated by the centrifugal force of the rotor while it is rotating, and to vibratory shear forces during oscillations of the blade about the flapping axis, the lead/lag axis, and the pitch variation axis. The combination of these compression and shear forces thus makes designing such laminated spherical bearings very complex and makes them difficult to make, requiring the dimensioning of such laminated spherical bearings to be adapted appropriately to be capable of withstanding those various stresses. As a result, a rotor having such blades and such laminated spherical bearings is heavy and complex to fabricate.

Furthermore, and as described in Documents EP 0 034 210 A2 and DE 27 12 706 A1, rotorcraft blades are known each including a respective recess suitable for receiving a laminated spherical bearing and an additional connection member fitted to one end of each blade.

Document FR 2 616 409 A1 describes a tail rotor blade having a root zone provided with a recess, the root zone being flexible in twisting and in bending.

Nevertheless, those various examples of blades are complex to make and they require additional connection members to be added. Rotors formed in that way thus present considerable weight.

BRIEF SUMMARY OF THE INVENTION

An object of the present invention is thus to propose monolithic blades presenting a particular shape and an associated rotor making it possible to be unaffected by the above-mentioned limitations. The invention achieves this in particular by a novel design for a monolithic blade making it possible to use laminated spherical bearings that perform solely the function of a hinge providing a ball joint type connection between the blade and the hub of the rotor. This type of monolithic blade thus serves to simplify its connection with the hub of a rotorcraft rotor and consequently to reduce the weight of such a rotor.

The invention thus relates to a monolithic blade for a rotorcraft rotor. Such a blade conventionally comprises an aerodynamically profiled zone, referred to below as the airfoil zone, having a suction side face and a pressure side face, i.e. the outlines of its sections are aerodynamic profiles constituted by a suction side face and a pressure side face.

Such a blade also has a root zone including a recess opening out on either side of a rigid portion of the root zone of the blade between a first face and a second face respectively extending the pressure side face and the suction side face of the airfoil zone of the blade towards said root end, such a recess being suitable for receiving a laminated spherical bearing.

According to the invention, the blade is remarkable in that the root zone comprises:

a finger with a spherical bearing surface arranged at a root end of the blade, such a finger being designed to cooperate via a linear-annular type connection with a cylindrical bore; and a flexible portion having a preferred direction of deformation in bending about a flapping axis of the blade, said flexible portion being arranged between said finger and said recess suitable for receiving said laminated spherical bearing.

In other words, such a blade, forming a single-piece unit, is for being secured directly to the hub of a rotorcraft rotor via a laminated spherical bearing inserted in the open recess in the root of the blade. Given its particular design, such a monolithic blade can also cooperate directly with an auxiliary lead/lag damper that is independent of the laminated spherical bearing. Such a lead/lag damper is then designed specifically to cooperate with the finger having a spherical bearing surface that is arranged at the root end of the blade. This root end of the blade is designed to be positioned as close as possible to the axis of rotation of the rotor.

Consequently, such a monolithic blade has both a root zone that is designed to cooperate with a central hub, and also an airfoil zone. The particular shape of the root zone of this blade then makes it possible to simplify the design of the laminated spherical bearings and thus reduce the dimensions and the weight associated therewith, firstly because there is no contribution to any function of damping the movement of the blades, and secondly because of the elimination of heavy flapping messes such as a cuff and the associated fastener parts, in particular. Specifically, such flapping masses of large inertia give rise to significant dynamic loads and to high levels of vibration that lead to the laminated spherical bearings being over-dimensioned.

Also, the portion of the blade that is flexible in a preferred flapping direction of deformation can itself enable this root zone extending from the finger to beyond the recess to contribute to the flapping movements of said blade.

The linear-annular type connection between the blade finger having a spherical bearing surface and the annular bore of the lead/lag damper also makes it possible to impart four degrees of freedom of movement between the finger and the bore. These four degrees of freedom may be resolved into three degrees of freedom to move in rotation about three axes forming a rectangular reference frame, together with one degree of freedom to move in translation in a direction parallel to the span of the blade, thereby authorizing flapping movements and lead/lag movements of a blade and also enabling its pitch to be varied.

Advantageously, the recess may be arranged at a narrowing of the chords of the blade in the root zone, with such a narrowing corresponding to a reduction in the chord of the blade relative to the chord of the airfoil zone of the blade.

In other words, the chord of the root zone at the recess for receiving the laminated bearing is smaller than the chord of the airfoil zone of the blade.

In practice, the flexible portion may comprise in full or in part a plate shape.

Consequently, such a flexible portion has a cross section, i.e. a section substantially perpendicular to the pitch axis of the blade, presenting a thickness that is constant, as contrasted to the thickness of the blade in the airfoil zone, where "thickness" is expressed perpendicularly to the chord of the sections of the root zone or to the chord of the aerodynamic profiles, depending on the zone in question. Such thickness in the flexible portion is also smaller than the maximum thickness of the blade measured in the airfoil zone. Also, such a flexible portion of the blade may have a plurality of cross sections presenting thicknesses that are different.

For example, the flexible portion may comprise in full or in part a first plate shape having a first predetermined thickness, and a second plate shape having a second predetermined thickness. The first plate shape is then secured to the finger with a spherical bearing surface, while the second plate shape is arranged in the proximity of the recess. The first plate shape is also in continuity in coplanar manner with the second plate shape.

The first and second predetermined thicknesses are thus advantageously selected to be different from each other. For example, the first predetermined thickness of the first plate shape can then be selected to be smaller than the second predetermined thickness of the second plate shape. The first predetermined thickness of the first plate shape may then be of the order of 10 millimeters (mm) to 20 mm, and the second predetermined thickness of the second plate shape may then be of the order of 20 mm to 40 mm.

In another embodiment in accordance with the invention, the flexible portion may comprise a plurality of cross sections presenting thicknesses that vary progressively from a minimum thickness $e1'$ towards a maximum thickness $e2'$ in the span direction of the blade.

In advantageous manner, the flexible portion may be arranged symmetrically on either side of a midplane of the root zone of the blade.

In this way, the flexible portion extends symmetrically relative to the midplane passing via the center of the finger having a spherical bearing surface and via the center of the laminated spherical bearing. In one particular situation, such a midplane may be substantially perpendicular to the axis of rotation of a rotor having a plurality of blades.

In a first embodiment, the flexible portion may have, at least locally, a cross-section that is I-shaped, the midplane defining an axis of symmetry of the central core of this section, such a flexible portion including two flanges on either side of the central core forming excrescences that are symmetrical about the midplane of the root zone of the blade.

Such an I-shaped cross-section is also good for guaranteeing both low weight for the flexible portion and lead/lag stiffness that is greater than flapping stiffness. Furthermore, such an I-shape can be used in particular when the flexible portion of the blade is obtained by a method of molding a thermoplastic material.

In a second embodiment, the flexible portion may include, at least locally, a cross-section of rectangular shape that is arranged symmetrically about the midplane of the root zone of the blade.

Such a rectangular shape for the cross-section is simpler to make than a cross-section of I-shape and may for example be made out of laminated composite materials obtained by superposing textile sheets comprising reinforcing fibers, such as glass, carbon, or aramid fibers in particular, that are pre-impregnated with a matrix such as an epoxy resin, for example, with these fibers being suitably oriented. Specifically, the preferred orientation of the fibers gives them anisotropic properties enabling modulus characteristics, and thus stiffness and strength characteristics, to be adjusted in the desired direction.

Advantageously, the root zone of the blade may be made out of at least one composite material selected in particular from the group comprising epoxy polymers, epoxy resins, epoxy resins filled with reinforcing fibers, textile mats based on reinforcing fibers embedded in an epoxy matrix, and woven, knitted, or braided textile sheets based on reinforcing fibers embedded in an epoxy matrix.

Compared with metal materials, such composite materials present better specific mechanical characteristics, i.e. better characteristics relative to their density, such as for the example static and fatigue breaking strengths and also concerning moduluses, it being understood that the Young's modulus of metals can be equalled by a some such composite materials.

In other words, such materials are well adapted to fabricating rotorcraft rotor blades, which need to be of weight that is as small as possible. Specifically, these materials, as described above, present a high specific modulus and thus a low density for a maximum elasticity modulus or Young's modulus. In particular, it is possible to obtain a Young's modulus that is greater than or equal to 70,000 megapascals (MPa) for a density of less than 2000 kilograms per cubic meter (kg/m3).

In practice, the rigid portion of the root zone of the blade may include a roving strap embedded in the material(s) forming all or part of the blade, the roving strap forming a loop to form at least a portion of the periphery of the recess in the blade, the loop being extended by two rectilinear portions arranged respectively on either side of the recess and then in the airfoil zone of the blade as far as the outer end of the blade, also referred to as its free end, i.e. the end that is to be located furthest away from the axis of rotation of the rotor.

More precisely, the roving strap, which adheres to the composite materials forming the airfoil and the rigid portion of the root zone, constitutes a spar that serves to transmit the centrifugal force generated by the rotation of the corresponding blade to the laminated spherical bearing. This is an essential strength element that serves to reinforce simultaneously the blade and the rigid portion of the root zone including the recess.

Such a roving strap is provided in particular in the form of skeins or in the form of rovings proper, with each of these forms being based by way of example on glass fibers R impregnated with a matrix of resin of thermoplastic or thermosetting type. This roving strap may be made either manually, or automatically, and it consists in depositing tapes of roving on tooling models or on fillers of the blade by stacking them, and then after further building up of the blade, performing a stage of polymerizing the entire assembly by applying a heating cycle.

The present invention also provides a rotor of a rotorcraft having at least two monolithic blades, a hub for driving the at least two blades in rotation about an axis of rotation of the rotor, and at least two laminated spherical bearings, each forming a respective ball joint type connection between a corresponding blade and the hub.

Such a rotorcraft rotor is remarkable in that the at least two blades are as described above.

Such a rotor thus has a plurality of blades as described above enabling specific laminated spherical bearings to be used that are less heavily loaded and enabling the number of flapping masses to be reduced and thus reducing weight and obtaining a better level of vibration.

Advantageously, the rotor may include at least one lead/lag damper secured by a fixed type connection with the hub, each finger having a respective spherical bearing surface of the at least two blades co-operating via a linear-annular type connection with a corresponding cylindrical bore formed in the lead/lag damper.

Such a lead/lag damper is then arranged close to the axis of rotation of the rotor. The cylindrical bore co-operating with the finger is arranged substantially radially relative to the axis of rotation of the rotor so as to provide a linear-annular type connection with the finger.

In a first variant of the invention, the lead/lag damper(s) may be made up of a plurality of disjoint members that are arranged circumferentially around the axis of rotation of the hub, each having a cylindrical bore co-operating with a corresponding finger having a spherical bearing surface of the at least two blades.

Under such circumstances, the various disjoint members are secured independently via a fixed type connection to the hub of the rotor.

In a second variant of the invention, the lead/lag damper(s) may be constituted by a monolithic ring that is arranged circumferentially around the axis of rotation of the hub, and that includes at least two cylindrical bores, each co-operating with a respective finger having a spherical bearing surface of the at least two blades.

Under such circumstances, the monolithic ring co-operates with the various blades and thus has a plurality of radially-extending cylindrical bores.

In practice, the lead/lag damper(s) may be of the laminated type.

In other words, such lead/lag dampers then comprise an inner strength member forming the cylindrical bores, and then on either side a stack of flexible main layers interposed between rigid secondary layers, and with an outer strength member covering the resulting assembly. The inner and outer strength members may be made of a metal material, e.g. an alloy of aluminum or of steel. The flexible main layers may be made using an elastomer material of polyurethane or rubber type, stacked in alternation with rigid secondary layers, e.g. made of metal material, e.g. an alloy of aluminum or of steel.

The stack of flexible main layers and of rigid secondary layers has an axis that is either vertical or else radial. Such an elastomer damper configurations and technologies are nowadays in widespread use.

Furthermore, the invention also provides a rotorcraft including a rotor as described above.

Thus, the invention relates to a rotorcraft that is provided by way of example with a main rotor and/or with an anti-torque rotor having monolithic blades as described above.

BRIEF DESCRIPTION OF THE DRAWINGS

The invention and its advantages appear in greater detail in the context of the following description of embodiments given by way of illustration and with reference to the accompanying figures, in which:

FIG. 1 is a perspective view from above of a rotorcraft in accordance with the invention and fitted with a rotor in a first variant of the invention;

FIG. 2 is a perspective view from above of a rotor in a second variant of the invention;

FIG. 5 is a fragmentary front view of said blade in a second embodiment;

FIG. 6 is a section view on A-A in FIG. 5, showing said blade in the second embodiment;

FIG. 7 is a side view in section of a rotorcraft rotor fitted with said blade in the second embodiment;

FIG. 8 is a side view in section of a blade in another embodiment in accordance with the invention;

FIG. 9 is a section view on B-B in FIG. 7, showing a blade in a first embodiment; and FIGS. 10 and 11 are section views on B-B in FIG. 7, showing two alternatives corresponding to said blade in the second embodiment.

Figure 3:
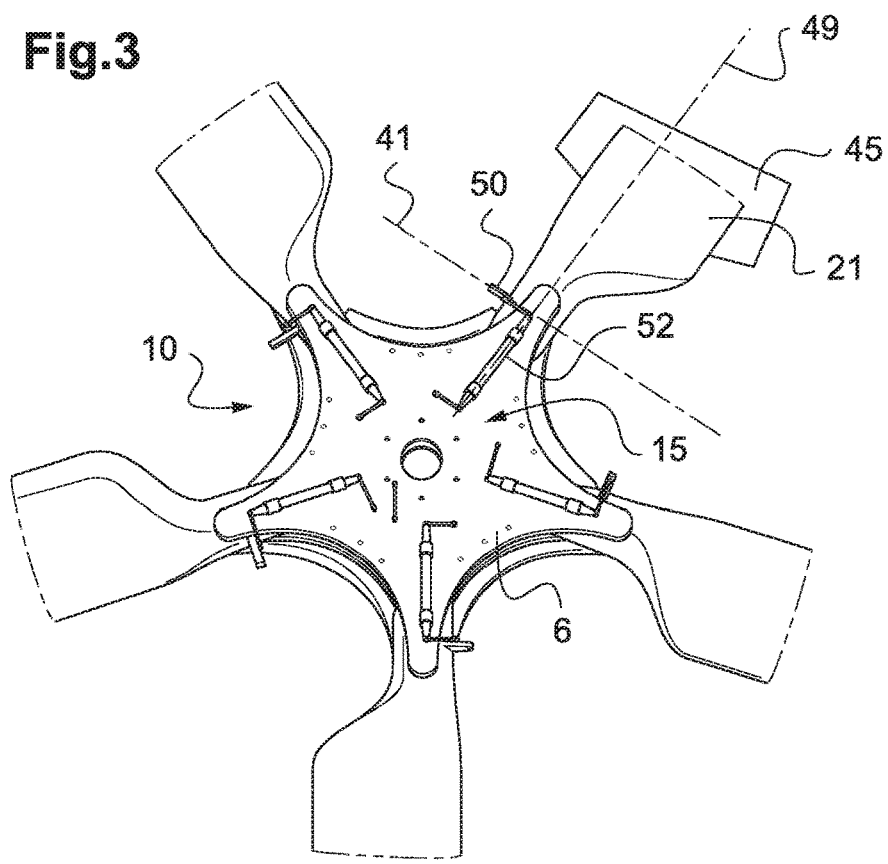
FIG. 3 is a perspective view from below of the rotor in the first variant of the invention.

Elements that are present in more than one of the figures may be given the same references in each of them.

DETAILED DESCRIPTION OF THE INVENTION

As mentioned above, the invention relates to the field of rotary wing aircraft, such as rotorcraft.

As shown in FIG. 1, a rotorcraft 1 in accordance with the invention is fitted with a rotor 10 having a hub 15 and monolithic blades 21, each connected to said hub 15 via a respective root zone 3.

In a first variant of the invention, the rotor 10 also has a lead/lag damper 16 co-operating with the ends of the blades 21. The lead/lag damper 16 is secured to the hub 15 via a fixed type connection and thus has no degree of freedom to move relative to the hub 15.

In addition, in this first variant of the invention, the lead/lag damper 16 is made up of a plurality of disjoint members 18, each co-operating individually with the root end of a respective one of the blades 21, and in particular with a finger as described below.

As shown in FIG. 2, and in a second variant of the invention, a rotorcraft in accordance with the invention may be fitted with a rotor 11 having a hub 15, blades 21, and a lead/lag damper 17 formed by a monolithic ring 19.

Such lead/lag dampers 16, 17 co-operating with the root ends of the blades 21 then serve to damp the lead/lag oscillations of the blades 21.

As shown in FIGS. 3 to 6, such a rotor 10 may, by way of example, include deflector bars 52 hinged relative to a bottom plate of the hub 15. Such deflector bars 52 may be controlled collectively or cyclically and they then serve to transmit turning movement in pitch to the various blades 21, each having a respective pitch lever 50 turned by a connecting rod 61 connected to the deflector bar 52, the pitch lever 50 forming an excrescence in a direction parallel to a transverse direction 41, itself perpendicular to a longitudinal direction 49 extending spanwise along the blade 21. Furthermore, the transverse direction 41 and the longitudinal direction 49 together form a midplane of symmetry 45 for all or part of the root zone 3 of the blade 21.

Figure 4:
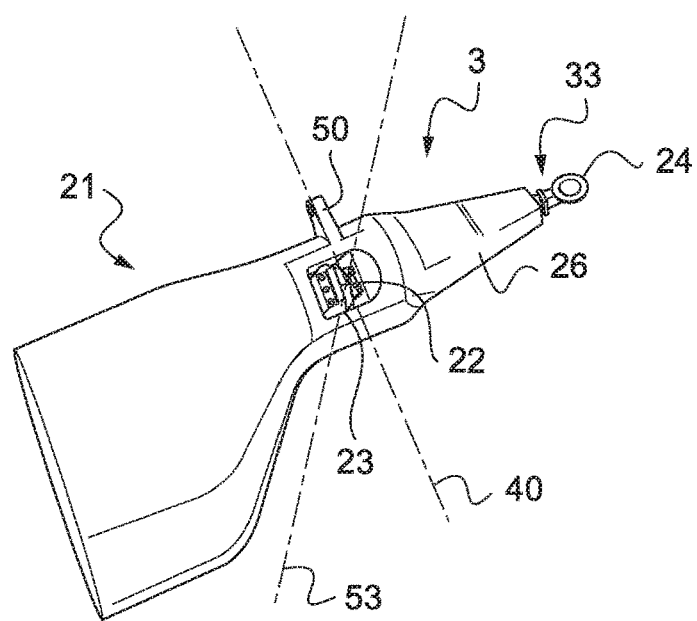
FIG. 4 is a perspective view of a blade in a second embodiment in accordance with the invention.

In FIG. 4, the blade 21 has a finger 24 at the root end 33 of the root zone 3, the finger having a spherical bearing surface for co-operating with the lead/lag damper 16, 17. The root zone 3 of the blade 21 also has a flexible portion 26 and a recess 23 formed in a rigid portion 64 in order to house a laminated spherical bearing 22.

Such a flexible portion 26 is remarkable in that it has a preferred direction of deformation in bending about a flapping axis compared with a direction of deformation in bending about a lead/lag axis 53. Such a flexible portion 26 is thus flexible in bending about the flapping axis 40, but in contrast it is rigid in bending about the lead/lag axis 53.

Advantageously, the finger 24 may be made of the same material as the material used for forming the flexible portion 26, however such a finger 24 could equally well be fitted to the root end 33 of the blade 21 and be made of a material other than the material of the flexible portion 26.

As shown in FIGS. 5 and 7, the flexible portion 26 of the blade 21 may have a first plate shape 28 presenting a first predetermined thickness e1, and a second plate shape 29 presenting a second predetermined thickness e2.

The first plate shape 28 is secured to the finger 24 with a spherical bearing surface, while the second plate shape 29 is arranged in the proximity of the recess 23. The first plate shape 28 is also in continuity in coplanar manner with the second plate shape 29.

In another embodiment in accordance with the invention, and as shown in FIG. 8, the flexible portion 125 of the blade 121 may equally well be in the form of a plate 128 of thickness in cross-section that varies continuously in the span direction of the blade 121 between a minimum thickness e1' and a maximum thickness e2'. The thickness of the cross-section can thus increase continuously along the flexible portion 125 between the finger 24 and the rigid portion 64 including the recess 23 of the root zone 3.

As shown in FIG. 5, the blade 21 includes a narrowing 27 arranged at a transverse direction 41 spaced apart from and parallel to a transverse direction 42 of sections in a zone 30 of the blade 21 that presents an aerodynamically profiled shape, referred to as the airfoil zone 30, as mentioned above.

As shown in FIG. 7, at the narrowing 27, there is the recess 23 opening out on either side of the rigid portion 64 of the root zone 3 of the blade 21 between a first face 34 extending a suction side face 31 of the airfoil zone 30, and a second face 35 extending a pressure side face 32 of the airfoil zone 30.

In FIGS. 5 and 6, the blade 21 also has a strap of roving 38 embedded in the material forming the blade 21. Such a roving strap 38 may thus be in the form of a skein or in the form of roving proper, and each of its forms may, for example, be based on glass fiber R.

The roving strap 38 serves to surround the periphery 39 of the recess 23 at least in part with a curved portion 43 and two rectilinear portions 44 on either side of the recess 23 and running into the airfoil zone 30 as far as the free end of the blade 21. This roving strap 38 can thus form the spar of the blade 21 and consequently serve to guarantee the mechanical strength of a blade 21 that is subjected to a large amount of centrifugal force during rotation of the rotor 10.

Also, as shown in FIG. 7, the hub 15 has a bottom plate and a top plate 5 that are secured firstly to the laminated spherical bearings 22 and secondly to the lead/lag damper 16.

The connection between the bottom plate 6, the top plate 5, and the laminated spherical bearings 22 is of the fixed type, and by way of example it may comprise clamping members 63, such as screws, bolts, or the like. Likewise, the connection between the blade 21 and the laminated spherical bearing 22 is of the fixed type, and may comprise a connection part 22' fitted to the inside of the recess 23 and secured to the blade 21 by clamping members 62 such as screws, bolts, or the like. Such a connection part 22' then serves to form an excrescence inside the recess 23 to which the laminated spherical bearing 22 can be secured by a fixed type mechanical connection, e.g. obtained by an adhesive method.

Furthermore, and as mentioned above, such a lead/lag damper 16 may comprise a plurality of disjoint members 18, each having a cylindrical bore 14 co-operating with the finger 24 via a linear-annular type connection.

As shown, the flexible portion 26 of the blade 21 is arranged symmetrically on either side of the midplane 45. Nevertheless, such a flexible portion 26 could include cross sections of different shapes.

Thus, in a first embodiment shown in FIG. 9, the root zone 2 of the blade 20 presents a flexible portion 25 having a cross-section 36 that is I-shaped. Under such circumstances, the flexible portion 25 has two flanges 46 and 47 forming excrescences that are symmetrical on either side of the midplane 45.

In FIGS. 10 and 11 and in a second embodiment, the root zone 3 of the blade 21, 51 has a flexible portion 26, 56 presenting a cross-section 37, 57 that is rectangular in shape.

A first alternative is shown in FIG. 10. In this alternative, the cross-section 37 of the flexible portion 26 of the blade 21 has an internal structure 55 of I-shape, providing this flexible portion 26 with its strength, and filler layers 58 and 59 arranged symmetrically on either side of the midplane 45. Such filler layers 58, 59 can thus be made out of a material that is distinct from the material used for forming the I-shaped internal structure 55.

By way of example, the internal structure 55 may be made as a stack of glass or carbon rovings with fibers that are oriented parallel to the longitudinal direction 49 of the blade 21. The filler layers 58 and 59 may be made with stacks of glass or carbon fabric oriented in balanced manner at plus-or-minus 45 degrees relative to the longitudinal direction 49 of the blade 21. The assembly formed by the internal structure 55 and the filler layers 58 and 59 is covered by a covering based on twill fabric made up of glass fibers R that are balanced in the warp direction and in the weft direction.

A second alternative is shown in FIG. 11. In this alternative, the cross-section 57 of the flexible portion 56 of the blade 51 may be formed by superposing textile sheets 60. The flexible portion 56 is then formed out of laminated composite materials so as to form a plurality of textile sheets 60 embedded in a matrix. For example, the textile sheets 60 serve to form a stack of glass fiber fabrics oriented so as to be balanced at plus-or-minus 45 degrees relative to the longitudinal (span) direction 49 of the blade 51.

Under such conditions, the transition relating to materials in the root zone 2, 3 of the blade 20, 21, 51 is as set out below. The transition between the finger 24, which may be made of metal, and the first plate shape 28 is provided, by way of example, by screws received in tapped metal inserts arranged in the thickness of the flexible portion 26.

In another configuration of the invention in which the finger 24 is made of composite material, the connection with the flexible portion 28 may be provided by extending reinforcing fibers constituting the flexible portion 28, possibly together with additional reinforcing fibers positioned in the proximity of the finger 24 having a spherical bearing surface.

Furthermore, the transition of the materials between the second plate shape 28, 29 and the rigid portion 64 of the root zone 2, 3 of the blade 20, 21, 51 may be provided on the surface by extending reinforcing fabrics of the root zone 2, 3 of the blade 20, 21, 51. Likewise, in the core, unidirectional reinforcing fibers may be arranged against the roving strap 38 in the rigid portion 64.

Finally, the transition of materials between the rigid portion 64 and the airfoil zone 30 of the blade 20, 21, 51 is provided in such a manner as to ensure continuity of the reinforcing fibers arranged in the narrowing 27 between firstly the roving strap 38 and secondly the reinforcements of the root zone 2, 3. The two rectilinear portions 44 of the roving strap 38 are arranged on either side of the recess 23 and extending to the running portion 48 of the blade 21. The surface reinforcing fabrics coming from the running portion 48 of the blade may, by way of example, be partially cutaway and folded to the inside of the recess 23 so as to provide better attachment for the fabrics at the borders of the recess 23.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A monolithic blade for a rotor of a rotorcraft, the blade comprising:
    at least locally an airfoil zone having a pressure side face and a suction side face; and
    a root zone including a recess opening out on either side of a rigid portion of the blade between a first face and a second face respectively extending the suction side face and the pressure side face of the airfoil zone towards the root end, the recess being suitable for receiving a laminated spherical bearing;
    wherein the root zone of the blade comprises:
        a finger with a spherical bearing surface arranged at a root end of the blade, the finger being designed to cooperate via a linear-annular type connection with a cylindrical bore; and
        a flexible portion having a preferred direction of deformation in bending about a flapping axis of the blade, the flexible portion being arranged between the finger and the recess suitable for receiving the laminated spherical bearing.

2. A blade according to claim 1, wherein the recess is arranged at a narrowing of a chord of the blade in the root zone, the narrowing corresponding to a reduction in the chord of the blade relative to the chord of the airfoil zone of the blade.

3. A blade according to claim 1, wherein the flexible portion comprises in full or in part a plate shape.

4. A blade according to claim 3, wherein the flexible portion comprises in full or in part a first plate shape having a first predetermined thickness e1, and a second plate shape having a second predetermined thickness e2, the first plate shape being secured to the finger with a spherical bearing surface, the second plate shape being arranged in the proximity of the recess, the first plate shape being juxtaposed in coplanar manner with the second plate shape.

5. A blade according to claim 3, wherein the flexible portion comprises a plurality of cross sections presenting thicknesses that vary progressively from a minimum thickness e1' towards a maximum thickness e2' in the span direction of the blade.

6. A blade according to claim 1, wherein the flexible portion is arranged symmetrically on either side of a midplane for the root zone of the blade.

7. A blade according to claim 6, wherein the flexible portion presents at least locally an I-shaped cross-section with two flanges forming symmetrical excrescences on either side of the midplane of the root zone of the blade.

8. A blade according to claim 6, wherein the flexible portion presents at least locally a cross-section of rectangular shape arranged symmetrically about the midplane of the root zone of the blade.

9. A blade according to claim 1, wherein at least the root zone of the blade is made out of at least one composite material selected from the group consisting epoxy polymers, epoxy resins, epoxy resins filled with reinforcing fibers, textile mats based on reinforcing fibers embedded in an epoxy matrix, and woven, knitted, or braided textile sheets based on reinforcing fibers embedded in an epoxy matrix.

10. A blade according to claim 1, wherein the rigid portion of the root zone of the blade includes a roving strap embedded in at least one material forming all or part of the blade, the roving strap forming a loop so as to form at least a portion of the periphery of the recess in the blade having a curved portion and two rectilinear portions on either side of the recess, such a loop extending from the recess into the airfoil zone of the blade as far as its free end.

11. A rotor of a rotorcraft having at least two monolithic blades, a hub for driving the at least two blades in rotation about an axis of rotation of the rotor, and at least two laminated spherical bearings, each forming a respective ball joint type connection between a corresponding blade and the hub;
    wherein the at least two blades are according to claim 1.

12. A rotor according to claim 11, wherein the rotor includes at least one lead/lag damper secured by a fixed type joint to the hub, each finger having a spherical bearing surface of the at least two blades co-operating via a linear-annular type connection with a cylindrical bore arranged in the lead/lag damper.

13. A rotor according to claim 12, wherein the at least one lead/lag damper is made up of a plurality of disjoint members, each having a cylindrical bore co-operating with a respective finger with a spherical bearing surface of the at least two blades.

14. A rotor according to claim 12, wherein the at least one lead/lag damper is formed by a monolithic ring having at least two cylindrical bores each co-operating with a respective finger having a spherical bearing surface of the at least two blades.

15. A rotor according to claim 12, wherein the at least one lead/lag damper is of the laminated type.

16. A rotorcraft wherein the rotorcraft includes a rotor according to claim 11.

\* \* \* \* \*